June 27, 1961   R. L. NELSON   2,989,907
GRAVITY OPERATED MASK ATTACHMENT FOR CAMERAS
Filed Jan. 11, 1958

INVENTOR -
Robert L. Nelson
By Dillon S. Turney
HIS ATTORNEY

United States Patent Office
2,989,907
Patented June 27, 1961

2,989,907
GRAVITY OPERATED MASK ATTACHMENT FOR CAMERAS
Robert L. Nelson, Libertyville, Iowa
Filed June 11, 1958, Ser. No. 741,282
2 Claims. (Cl. 95—36)

My invention relates to a useful improvement and device for photographic cameras, and more particularly to a multiple exposure attachment for use with such cameras which permits doubling the number of exposures which may be made on one film.

Devices of this nature have heretofore been known which were designed and intended for use with plate type cameras for permitting two exposures to be taken side by side on the same plate; however, no successful attempt has been made to permit the taking of more that one exposure on a single area of film except by means of completely removable masks or other devices which required the opening of the camera or the manipulation of mask changing mechanisms from outside of the camera operating through the case of the camera.

It is highly desirable from a standpoint of economy that frequently the entire area of film be divided and only one-half of the film exposed at any one time, thus permitting the user to take twice as many pictures on the same roll of film and at the same time permit this advantage to be gained without the necessity of externally operating a changeable mask, altering or modifying the camera, or opening the camera at intervals except when necessary for the changing of film.

Accordingly, it is the principal object of my invention to provide a dual exposure attachment for roll film cameras, which is positively operated by gravity.

It is a further object of my invention to provide a simple gravity operated sliding mask attachment for cameras which permits doubling the number of pictures that may be taken on a roll of film.

It is another object of my invention to provide a simple gravity operated mask attachment for cameras which is easily put in place and which in no way alters or interferes with the normal operation of the camera.

It is a still further object of my invention to provide a simple masking device which can be readily attached to or removed from a conventional camera, and which results in an economy of film and in the simple and foolproof operation of the same by the user.

Other objects and advantages will be apparent from a description of this invention and its construction, application and use will be better understood from the following detailed description thereof taken in connection with the accompanying drawings and the scope of this invention will be pointed out in the appended claims.

Referring to the drawing, FIGURE 1 is a perspective view of the sliding mask attachment showing the mask in the midpoint or center position.

Figures 1, 2:
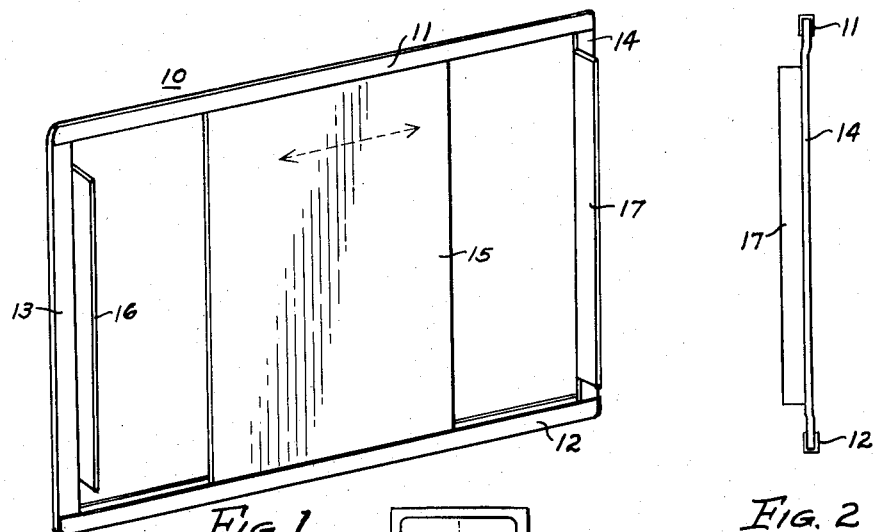
FIGURE 2 is an end view of the mask attachment shown in FIGURE 1.

Referring now to FIGURE 1, it will be noted that my invention comprises a rectangular frame indicated generally by the numeral 10 which of course may be of any desired dimension depending on the style and dimensions of the camera with which it is to be used. The frame 10 consists of a pair of U-shaped grooved top and bottom members 11 and 12 which are secured in a rigid spaced parallel relationship by means of the end members 13 and 14. The interior grooves in the members 11 and 12 receive the mask or panel 15, and permit the mask 15 to slide freely from one end of the frame 10 to the other end as shown by the dotted arrow in FIGURE 1. It is particularly essential that the fit of the panel 15 within the groove of the members 11 and 12 be a loose sliding fit so that it is only necessary to tip the frame approximately 30° to 45° whereupon the panel will freely slide to the downward end of the frame.

For example, tipping the frame as shown in FIGURE 1 with the left side downward will cause the panel 15 to slide to the left completely obscuring the left half of the film and leaving the right half open. Conversely, tipping the frame in the opposite direction will reverse the action and the panel will freely slide to the right end of the frame.

For holding the frame and sliding mask in place a pair of right angled clips 16 and 17 are provided on the inner surface of each of the end members 13 and 14 respectively. These clips are designed to fit within the film exposure aperture at the back of the camera, and do not need to have any particular gripping or clinching action with the frame since the frame 10 will be held in place by the film passing over it and by the back of the camera being pressed lightly against the film when the camera is closed. A reference to FIGURE 2 will show the end view of the mask and frame and shows the manner in which the clip 17 extends inwardly from the frame in the direction of the lens of the camera.

Figure 3:
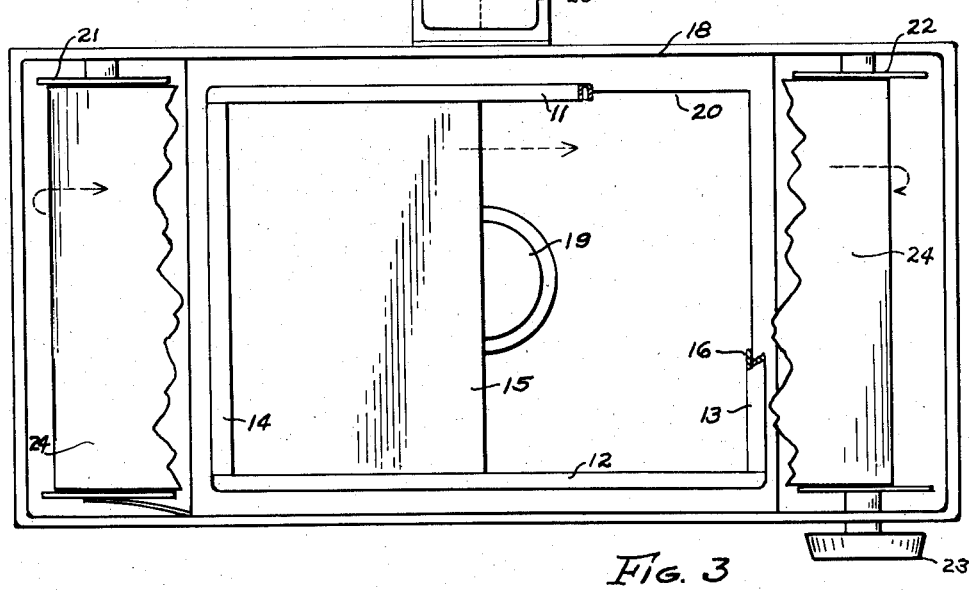
FIGURE 3 is a back view of a conventional camera with the back of the case removed and showing the sliding mask attachment in place as the same would appear in normal use.

Reference should now be had to FIGURE 3 in which is shown a more or less conventional type of camera which can be either the folding or the box type since nearly all cameras are provided with a similar aperture or opening in the back across which the sensitized film passes. The camera case is indicated at 18 and is provided with a centrally located lens 19 and a rectangular aperture 20 behind the lens and over which the film passes. As is customary in cameras of this type a new roll of unexposed film 21 is freely pivoted on one side of the camera, as shown on the left in FIGURE 3, and a winding reel 22 for drawing the film across the film opening 20 is positioned on the other side of the camera. A manually operated key or knob 23 is provided for rotating the film reel and winding the film on the reel 22 and the sensitive film itself 24 has been broken away, as shown in the drawing, for purposes of showing the frame 10 and panel 15 in place. However, it should be understood that the roll of film extends completely across the back of the camera from the new roll 21 to the winding reel 22. Other details of the camera are not shown since they are not material in gaining an understanding of this invention.

The rectangular frame 10 is shown in place fitting snugly within the aperture 20 and being held in that position by means of the inwardly extending clips 16 and 17, one of which is visible in the drawing of FIGURE 3, a portion of the frame 10 being broken away to show its overlapping and fitting relationship with the aperture 20. In the view of FIGURE 3, the mask or panel 15 is shown in the left hand position lying adjacent the end member 14, and it will be obvious that the right hand half of the frame is open and unobscured, thus allowing the portion of the film lying over this half to be exposed. After exposure of this half of the film, it is only necessary to tilt the camera to the right and the user can easily hear the sliding panel 15 as it slides to the right and clicks against the right hand member 13, as indicated by the dotted arrow. The camera is then ready for use and another picture may be taken on the left half of the film which was masked and covered in the first instance, thus permitting two exposures to be taken within an area of film where without the mask only one picture could have been taken.

The camera may be provided with a conventional view finder through which the user centers the picture he desires to take, and a simple form of view finder has been shown at 25 and it is only necessary to remember that when the right hand side of the film is being exposed, as shown in FIGURE 3, the operator should center his picture in the left half of the view finder 25 and conversely when the sliding panel 15 has been tilted to the right so that the left half of the film is being exposed, the user should then center his pictures in the right hand half of the view finder.

It will be apparent from the foregoing description that the attachment as shown and described is extremely simple and foolproof, that it is easily inserted in place at the time the camera is unloaded and reloaded of film, and that the entire operation of the sliding panel is effected by gravity with no external mechanical controls or manipulating devices being required to slide the panel from one side to the other. Further, it permits the taking of twice as many pictures on the same roll of film and does not in any way alter, change or damage the camera for its normal use since the mask attachment is quickly and easily attached and removed without the use of any tools or without precision or skill on the part of the operator.

It should be pointed out that while the mask is shown as being of rectangular configuration, obviously it can be of any desired dimension to fit the particular model or style of camera with which it is to be used and the materials of which the attachment may be made are not critical; however, it is desirable that the sliding panel 15 be of substantial thickness and weight so that it will move positively and freely from one side to the other when actuated by gravity by the tilting of the camera.

While I have shown and described a particular embodiment of my invention, it would be apparent to those skilled in the art that certain changes and modifications may be made therein without departing from my invention in its broader aspects and I, therefore, aim in the appended claims to cover all and any such modifications as may be made and which do not depart from the true spirit and scope of this invention.

What I claim as new and desire to secure by Letters Patent of the United States is:

1. The combination with a photographic camera having a case, a view finder of substantially rectangular shape, a lens assembly and a rectangular aperture in the part of said case opposite said lens assembly over which sensitive photographic film is adapted to pass, of a mask comprising a removable rectangular rigid frame having parallel top and bottom members and parallel end members, said end members having a depressed offset center portion, force-fitting clip means secured to the inner edge of said end members for engaging the inner surface of said aperture in said camera case for holding said mask in place, a groove in each of said top and bottom members disposed in parallel facing relationship, an opaque rectangular panel having an area less than the area of said rigid frame slideably carried by said grooves and freely moveable in response to gravity to a position from one end of said mask frame to the other end of said mask frame, and a vertical dividing line impressed on said view finder to divide the aperture of said view finder into two equal rectangles proportionate in size to the rectangular aperture in said camera case.

2. The combination with a photographic camera having a case, a lens assembly, a view finder of substantially rectangular configuration secured to said case, a rectangular aperture in the portion of said case directly opposite said lens assembly over which sensitized film is arranged to pass, and a removable back closure for said case arranged to cover said aperture and film, of a mask attachment comprising a removable rigid frame having parallel top and bottom members of U-shaped cross-section in facing relationship and parallel right and left side members of L-shaped cross-section, said L-shaped members being offset at their outer ends and having one leg of the L arranged to project at right angles to the plane of said frame inwardly to engage in force-fitting relationship with the inner sides of the rectangular aperture in said camera case, said L-shaped members being spring tensioned outwardly to engage a portion of the inner edges of said aperture with gripping effect, an opaque panel having an area approximately one-half of the area of said rigid frame and being carried by said frame in slideable relationship to said frame in said facing U-shaped grooves, and said view finder having a centrally located line for dividing the visual area of said finder into two equal portions.

References Cited in the file of this patent

UNITED STATES PATENTS

| | | |
|---|---|---|
| 1,137,185 | Chase | Apr. 27, 1915 |
| 1,673,641 | Ruby | June 12, 1928 |
| 1,991,924 | Dolan | Feb. 19, 1935 |

FOREIGN PATENTS

| | | |
|---|---|---|
| 1,028,002 | France | Feb. 25, 1953 |